A. YOUNG.
RUPTURE TRUSS.
APPLICATION FILED MAY 11, 1908.
900,250. Patented Oct. 6, 1908.
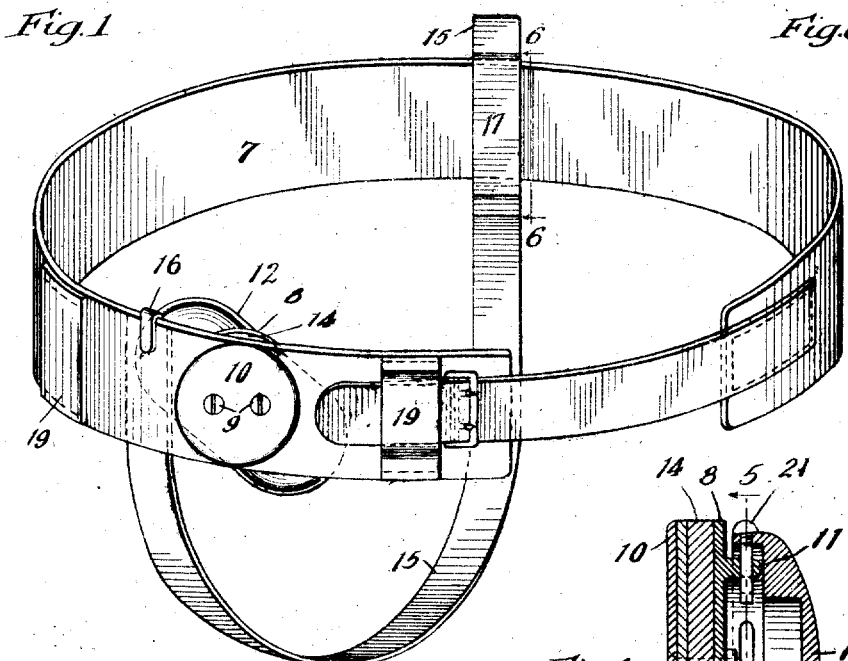
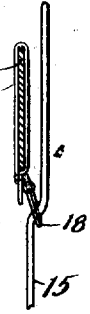
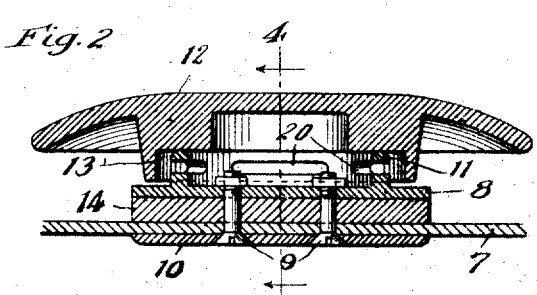
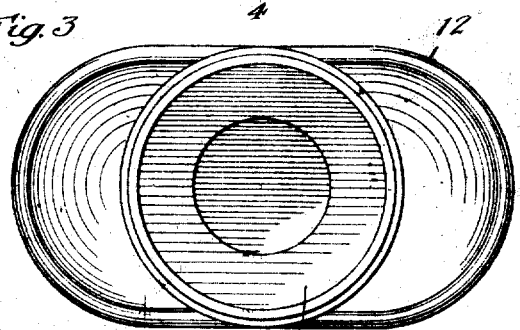
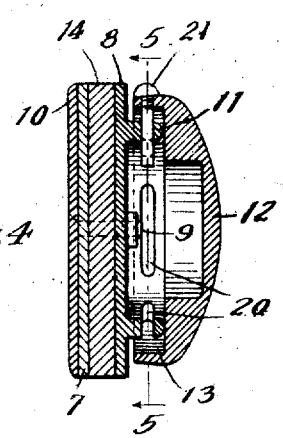
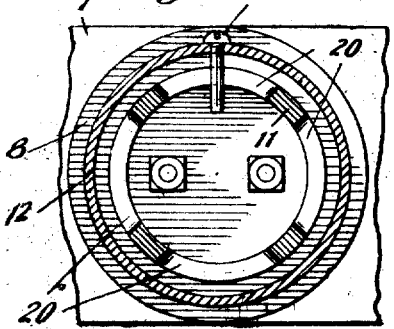
Witnesses:
Wm. Geiger
H. M. Munday
Inventor:
Alexander Young
By Munday, Evarts, Adcock & Clarke.
Attorneys

UNITED STATES PATENT OFFICE.

ALEXANDER YOUNG, OF LAPORTE, INDIANA, ASSIGNOR OF ONE-HALF TO WILLIAM N. RUMELY, OF LAPORTE, INDIANA.

RUPTURE-TRUSS.

No. 900,250.    Specification of Letters Patent.    Patented Oct. 6, 1908.

Application filed May 11, 1908. Serial No. 432,046.

*To all whom it may concern:*

Be it known that I, ALEXANDER YOUNG, a citizen of the United States, residing in Laporte, in the county of Laporte and State of Indiana, have invented a new and useful Improvement in Rupture-Trusses, of which the following is a specification.

This invention relates to the construction of rupture pads which are pivotally secured to supporting belts or saddles, and its main object has been to give the pad an increased range of adjustment over prior constructions.

The nature of the invention is fully set forth below, and also illustrated in the accompanying drawing forming a part of this specification, and in such drawing, Figure 1 is a perspective of the invention. Fig. 2 is a longitudinal section of the pad and its attaching devices. Fig. 3 is an inside elevation of the pad. Fig. 4 is a section on the line 4—4 of Fig. 2. Fig. 5 is a section on the line 5—5 of Fig. 4. Fig. 6 is a section on the line 6—6 of Fig. 1.

In said drawing, 7 represents the belt or other device to which the pad is attached and by which it is held in position upon the body of the user. This belt is provided with what I call a trunnion saddle, formed by the plates 8 and 10 located on opposite sides of the belt and secured together and to the belt by bolts 9. The plate 10 is on the outside of the belt and is flat and smooth, while the plate 8 is on the inside, and is provided with a raised rim 11, circular in form and forming a trunnion upon which the pad may be adjusted or turned at will, as hereinafter stated.

The pad proper, that is the part which is placed against the flesh of the user is shown at 12. It is made oblong, so that when once positioned in any desired position on the yielding flesh it will embed itself and maintain its position without turning. Upon the inside it is provided with a circular recess 13 adapted to admit the trunnion or rim 11, and form a bearing therefor. The recess is however considerably larger in diameter than the trunnion, so that when the parts are assembled, the pad will be capable of shifting for a limited distance in any direction across the axis of the trunnion and also be capable of turning. In this manner I make the pad adjustable upon the saddle in a manner permitting small adjustments without removing the truss from the person. The trunnion rim is also made deep enough so as to permit the pad to tip to an angle from the plane of the belt without becoming disengaged.

In order upon occasion to make the pressure of the pad upon the person greater, I sometimes insert between the belt and the plate 8 a filling piece or block of felt 14 or other suitable material, and secure it by the same bolts 9 which secure the parts of the saddle together.

The strap 15 is intended to prevent the belt from slipping upward upon the body, and its front end is supported from the belt by a hook 16 which fits down upon the upper edge thereof, and its rear end is provided with a loop 17 loosely encircling the belt and adjustable along the same. The loop 17 is attached to the strap 15 by a buckle 18. The belt is preferably stiffened by a vertical piece 19 of material like that of the belt itself, so it will not bend or curl under the stress caused by the hook 16.

The pad is preferably attached to the saddle in some manner which permits it to be readily removed, but which will prevent its falling off in the ordinary handling of the truss. The construction I have adopted for this purpose is illustrated particularly at Figs. 4 and 5, and consists in cutting slots 20, 20 in the trunnion rim as shown, and inserting through the wall of the recess 13 a pin 21 adapted to pass through said slots and having sufficient length to remain engaged therein in the changes of position by the pad. This pin should have a threaded engagement with the wall of recess 13 through which it passes.

I claim:—

1. The combination with a device whereby the pad is supported, of a pad attached to the supporting device by a trunnion upon which the pad is adjustable in all directions across the axis of the trunnion.

2. The combination with a belt or supporting device carrying a circular rim forming a trunnion, and a pad having a recess adapted to set over said trunnion, said recess being larger in diameter than the trunnion, and the trunnion and wall of the recess being both adapted to receive a pin whereby the pad and belt may be locked together.

3. The combination with a belt or supporting device carrying a circular rim forming a trunnion, and a pad having a recess adapted to set over said trunnion, said recess being larger in diameter than the trunnion, said trunnion and pad being provided with
5 means for locking them together without destroying the adjustability of the pad.

4. The combination with the belt and the recessed pad, of means for supporting the latter, consisting of a trunnioned plate at one side of the belt, a holding plate at the 10 other side thereof, and bolts passing through the plates and belt, and permitting the insertion of filling material between the belt and trunnion plate.

ALEXANDER YOUNG.

Witnesses:
C. E. GOODRICH,
JOHN S. MARTIN.